Feb. 15, 1966 R. VAN PEBORGH 3,234,597
HOMOGENIZING DEVICE FOR THERMOPLASTIC
MATERIALS WORKED IN EXTRUSION
MACHINES AND THE LIKE
Filed Jan. 11, 1963 2 Sheets-Sheet 1

Inventor
ROBERT VAN PEBORGH
per: Linton and Linton
Attorneys

Inventor
ROBERT VAN PEBORGH
per: Sinton and Sinton
Attorneys

United States Patent Office 3,234,597
Patented Feb. 15, 1966

3,234,597
HOMOGENIZING DEVICE FOR THERMOPLASTIC MATERIALS WORKED IN EXTRUSION MACHINES AND THE LIKE
Robert Van Peborgh, Rue Daru 20, Paris, France
Filed Jan. 11, 1963, Ser. No. 250,844
4 Claims. (Cl. 18—12)

The present invention has for an object to provide a homogenizing device for thermoplastic materials operated upon in extrusion machines, die-plate machines and the like used for extrusion of such materials.

It is known that in extruding thermoplastic materials, one meets generally with great difficulties in obtaining a homogeneous temperature within the extruded mass and also homogeneous distribution of the constituents of such mass. These difficulties mainly result from the nature itself of the thermoplastic materials which are very poor conductors of heat. On the other hand, the path traversed by the material during the extrusion is determined by the profiles of mechanical parts brought to different temperatures, such as for instance the screw and the sleeve of the extruding machine. These difficulties, which may be relatively reduced when performing the extrusion of thin tubes, rods or profiles, may however become particularly important in extruding thick masses, tubes and sections.

The present invention has for an object to provide a device for eliminating these drawbacks. For this purpose, this device which comprises a tubular member interposed between the sleeve and the screw of the extruding machine and the die member, and a mandrel fixed within the axis of this tubular member so as to provide an annular tubular member between it and the inner wall of the channel, is principally characterized in that the iner wall of the tubular member and the wall of the mandrel are shaped in such manner that this annular channel presents a radial depth progressively decreasing starting from the sleeve of the extruding machine and subsequently progressively increasing, whereas its inside diameter is progressively increasing and then decreasing in the same direction, these variations being such that the area of passage cross-section of said annular channel remains substantially constant over its whole length.

Under such conditions, the thermoplastic material impelled by the screw of the extruding machine is initially subjected, within the annular channel provided between the mandrel and the tubular member extension of the sleeve, to a progressive thinning while keeping the same area of cross-section as at the inlet of the channel, so that the plastic material receives in penetration the heat supplied by the walls of the tubular member and of the mandrel and which were brought to the required temperature by the usual heating means. Continuing its operating path, the thermoplastic material then enters in a part of the annular channel of larger radial width but of smaller average diameter, where said thermoplastic material is folded upon itself. This successive spreading and folding up of the thermoplastic material in contact with the heating parts of the tubular member and of the mandrel secure a remarkable homogenizing of the thermoplastic material, both with relation to its temperature and to its composition, and this without any mechanical working of the material.

Preferably, in the practical application of the present invention, the tubular member interposed between the sleeve and the die member of the extruding machine and the mandrel located within this tubular member, are arranged so that the annular channel provided therebetween presents two or more of such thinnings and enlargements in succession as described herebefore, which brings about a repetition of the spreading and folding up processes of the thermoplastic material, and consequently, a much more intensive homogenizing of the latter.

It is also preferable that the inner wall of the tubular member and the mandrel present profiles of ovoid shape. Indeed such form has been found the most favorable for obtaining a rational orientation of the molecules of the pasty mass during its passage through the homogenizing device, this being due to the fact that this ovoid form presents to said thermoplastic material curves of impact and curves of discharge which only oppose a weak resistance to its progress and favor the formation of the folds aimed at.

Further characteristics and advantages of the present invention will be apparent from the description hereafter with reference to the accompanying drawings, given by way of examples but nonlimitative, and in which.

Figure 1:
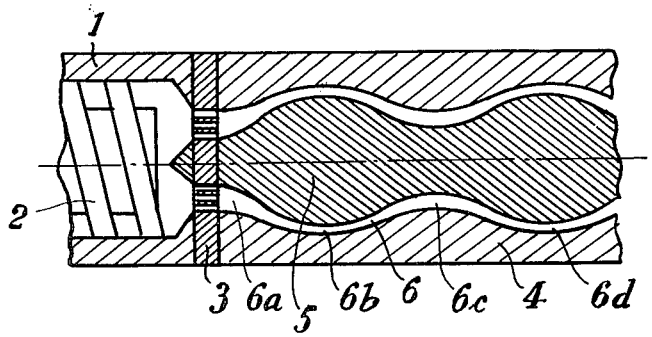
FIGURE 1 is a diagrammatic axial longitudinal cross-section of one form of embodiment of a homogenizing device according to the present invention.

In the example of FIGURE 1, 1 is the sleeve surrounding the screw 2 of an extrusion machine or the like. At the end of this sleeve is connected, with interposition of a grid 3 of known type, a tubular member 4, a mandrel 5 being axially fixed therein by any convenient means so as to provide within said tubular member an annular channel 6.

According to the present invention, the respective profiles of the inner wall of the tubular member 4 and of the mandrel 5 are made in such a way so that the channel 6 presents at 6a, close to the grid 3, an average internal diameter relatively small, corresponding substantially to the diameter of the outlet opening of the sleeve 1 of the extruding machine, and a relatively large radial depth. Then the internal diameter of the channel 6 is progressively increasing along the length from the grid 3 up to reaching a maximum at 6b, whereas its radial depth is decreasing progressively in the same direction so as to reach a minimum at 6b, said variations being such that the passage area cross-section of said channel remains substantially constant. As the distance from the end increases still further, then the average internal diameter of the channel 6 is progressively decreasing up to point 6c whereas its radial depth is progressively increasing up to the same point, its area cross-section remaining substantially constant, all the time. Over the whole distance similar variations in channel diameter and depth may be repeated from 6c to 6d, and so on, according to the requirements of the homogenizing work for the thermoplastic material being treated in the machine. As mentioned herebefore, said variations are advantageously obtained by giving to the tubular member 4 and to the mandrel 5 conveniently chosen ovoid profiles.

The tubular member 4 and the mandrel 5 may be heated by any known means, for instance by electric resistances embedded in their walls.

Figure 2:
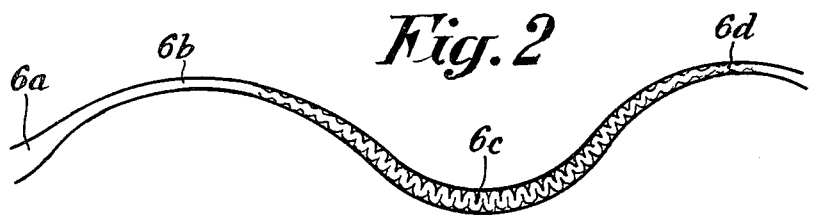
FIGURE 2 is a diagrammatic longitudinal half-section of the annular channel illustrating the process of a thinning and a folding up of the thermoplastic material within the said channel.

FIGURE 2 illustrates diagrammatically the advancing of the thermoplastic material propelled through the annular channel 6 formed as described. After traversing the grid 3 and entering within the part 6a of the annular channel 6, the thermoplastic material is subjected to a progressive thinning until it reaches the part 6b where it is held between walls very close to each other while keeping the same area of cross-section as at the inlet of the channel 6, and this allows the material to be penetrated in depth by the heat supplied by the walls of the tubular member 4 and of the mandrel 5. Continuing its operating path, the thermoplastic material arrives within the part 6c of the channel, which part has a larger radial width, where it is folded upon itself. Subsequently it is propelled along the narrowed part 6d where it is subjected to a new spreading and so on.

Figure 3:
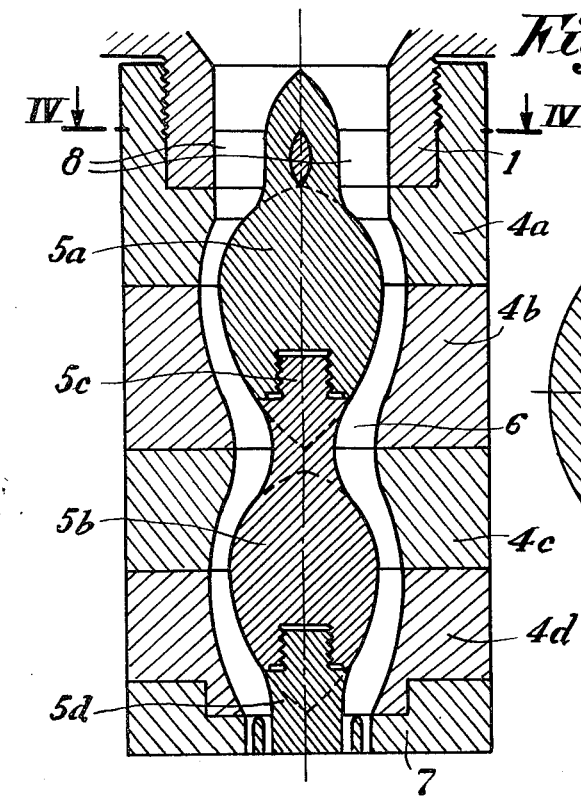
FIGURE 3 is an axial longitudinal cross-section of a practical modified form of embodiment of a device according to the present invention applied to an extrusion machine of which the die member is adapted to the formation of granules.
Figure 4:
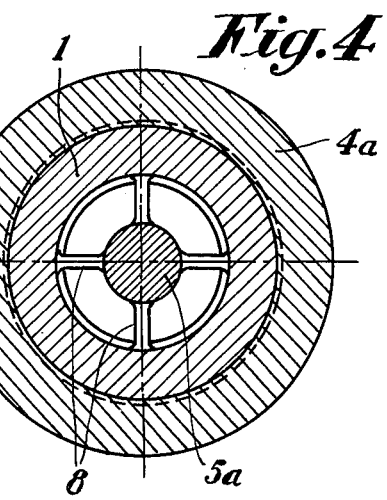
FIGURE 4 is a transversal cross-section according to line IV—IV of FIGURE 3.

In the form of embodiment illustrated in FIGURES 3 and 4, reference 1 indicates the end of the sleeve of an extrusion machine to which is connected a device according to the present invention. The latter here comprises two ovoid parts inserted between the sleeve 1 and the die member 7 of the machine, formed in this example by a die for granulated material. The first ovoid part, adjacent to the sleeve 1, comprises a tubular member formed by two annuli 4a, 4b of which the inner bores are shaped so as to produce a wall of ovoid profile, in the axial direction and a mandrel 5a also of ovoid profile; the latter being held centered within the tubular member 4a–4b by radial arms 8 integral with the sleeve 1 of the machine and forming an inlet grid. The profiles of the inner wall of the tubular member 4a–4b and of the mandrel 5a are shaped so that the annular channel 6 provided between them presents the characteristics mentioned herebefore. The second part of the device, adjacent to the die member 7, comprises also a tubular member formed by two annuli 4c, 4d and a mandrel 5b. The mandrel 5b is connected to the mandrel 5a by an axial tenon 5c fitting within a corresponding mortise of the latter and on the other hand it is centered and held by means of a terminal member 5d integral with the die member 7. The profiles of the inner wall of the tubular member 4c–4d and of the assemblage formed by the mandrel 5b and the parts which joint the latter, on the one hand to the mandrel 5a, and on the other hand to the die member 7, are also shaped so that the corresponding parts of the annular channel 6 present the desired variations in diameter and radial depth.

Figure 5:
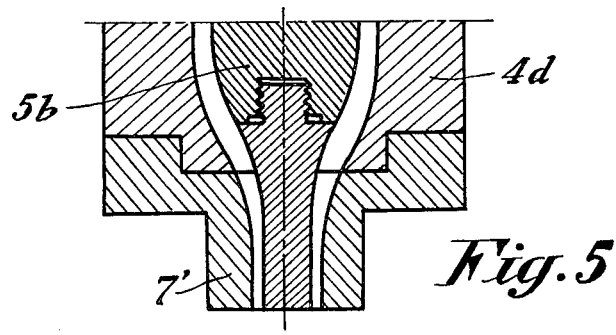
FIGURE 5 is a partial axial cross-section of a modified form of device provided with a die member adapted to the formation of a tube.
Figure 6:
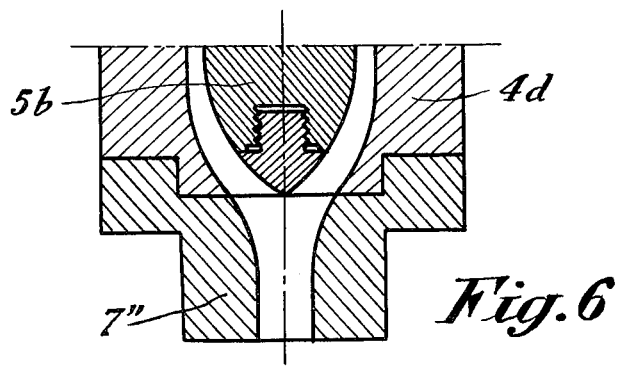
FIGURE 6 is an axial cross-section showing a modified form of device provided with a die member adapted to the formation of a rod.

Instead of being a die member for granulated material, the die at the end of the homogenizing device may consist of die 7' intended for the formation of a tube, as may be seen in FIGURE 5, or of a die member 7'' intended for the formation of a rod, as illustrated in FIGURE 6. In this latter case the terminal mandrel 5b presents a free end 5e conveniently tapered and the centering of said mandrel may be detained by means of radial arms (not illustrated) similar to the arms 8 described herebefore for FIG. 3.

In addition to the advantages of the preferred form of the invention which have been mentioned herebefore and which consist in obtaining an excellent homogenizing of the thermoplastic material under treatment, both in temperature and in composition, the device according to the present invention results to effect a considerable lowering of the working temperature. This lowering, which is a direct result of the perfect homogenizing, may be in the range of 15 to 20° C. Moreover it affords a higher safety of working, by eliminating the excess of heating generally practised for obtaining a sufficient average temperature within the depth of a mass of poor conductivity.

A further advantage of the device according to the present invention, consists in the fact that it presents a considerable capacity for gelling, which allows to produce a gelled thermoplastic material directly from powder, without passing through the intermediate steps of producing compounds or granules, and this substantially in the same time as starting with such granular products.

On the other hand, in the case where the device is used in the manufacturing of granulated material, the possibility of operating at a lower temperature allows to operate cutting in heated condition of the granules, due to the fact that the latter have no tendency to agglomerate in clusters.

Figure 7:
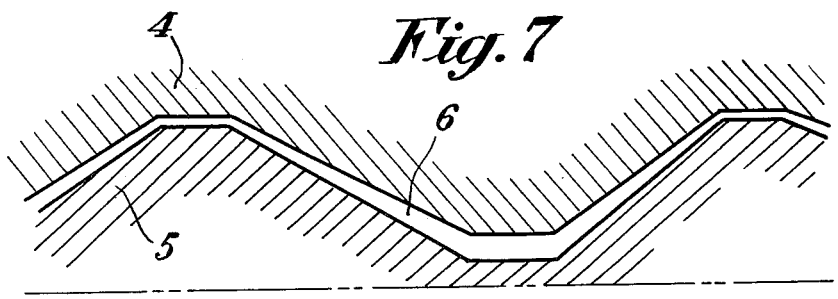
FIGURE 7 is a diagrammatic half-section of a modified form of the channel device presenting angular profiles for the tubular member and mandrel.

It is obvious that constructive modifications may be introduced in the forms of embodiment illustrated and described, without departing from the scope of the present invention. Particularly, the number of ovoid parts of the device may be different from two and namely it may be higher than this number. The dimensions of the parts may be different from one part to the other. On the other hand, although the ovoid shape illustrated in the examples presented the most advantageous for the reasons indicated herebefore, the present invention is not limited to this shape. Similar results may be obtained with relation to the diameter variations and to the variations in radial width of the annular channel 6, by using for the tubular member 4 and the mandrel 5 angular profiles, as shown in the simplified variation of FIGURE 7, this latter arrangement facilitating the machining of the parts.

Finally it is understood that the applications of the homogenizing device according to the present invention are not restricted to string forming machines and similar extrusion machines, but said device is also adapted to be used in molding presses for thermoplastic materials by injection, and in this case it may be inserted between the parts supplying the pressure (by plunger or screw) and the mold.

What I claim is:

1. In the homogenizing apparatus for flowable plastic material, a tubular member having a longitudinal curvilinear internal contour, a mandrel positioned within said tubular member in spaced relation thereto and having a longitudinal external curvilinear contour, said internal contour and external contour forming a channel of varying radial depth therebetween extending substantially the full length of said tubular member and said mandrel, an intake grid mounted at one end of said tubular member, a discharge die mounted at the other end of said tubular member, the longitudinal position of the points of maximum diameter of said curvilinear contour of said tubular member along its length corresponding to the points of maximum diameter of said mandrel along its length, and the longitudinal positions of the points of minimum diameter of said curvilinear contour of said tubular member along its length corresponding to the points of minimum diameter of said curvilinear contour of said mandrel along its length, the dimensions of said curvilinear contours of said tubular member and said mandrel at successive points along the length thereof being so determined that the numerical value of the radial transverse cross-sectional area of the channel between said contours is substantially constant along the entire length of said tubular member and said mandrel.

2. Apparatus according to claim 1, both said curvilinear contours having a plurality of points of maximum diameter and a plurality of points of minimum diameter along their length.

3. Apparatus according to claim 1, a point of minimum diameter of both of said curvilinear contours being located adjacent said intake grid at one end of said tubular member.

4. Apparatus according to claim 1, the cross-sections of the curvilinear contours of said tubular member and said mandrel taken at successive positions along their length being ovoids.

References Cited by the Examiner

UNITED STATES PATENTS

| | | | |
|---|---|---|---|
| 2,192,263 | 3/1940 | Johnson | 18—30 |
| 2,358,354 | 9/1944 | Stacy et al. | 18—30 |
| 2,367,144 | 1/1945 | Shaver | 18—30 |
| 2,629,898 | 3/1953 | Orsini | 18—14 |
| 2,978,748 | 4/1961 | McCauley et al. | 18—14 |

FOREIGN PATENTS 843,849   8/1960   Great Britain.

J. SPENCER OVERHOLSER, *Primary Examiner.*

WILLIAM J. STEPHENSON, *Examiner.*